T. W. TEMPLE.
OYSTER-OPENING MACHINE.
No. 189,966.   Patented April 24, 1877.
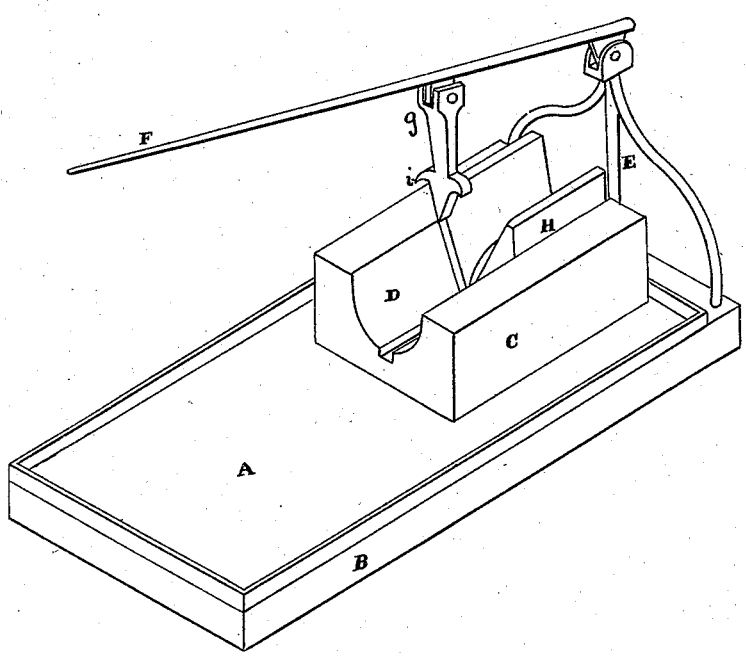
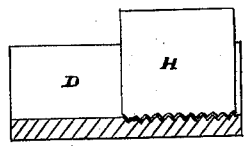
Witnesses
Geo. H. Strong
Jno. L. Boone
Inventor
Thomas W. Temple
by Dewey & Co
Attys

UNITED STATES PATENT OFFICE.

THOMAS W. TEMPLE, OF LOS ANGELES, CALIFORNIA.

IMPROVEMENT IN OYSTER-OPENING MACHINES.

Specification forming part of Letters Patent No. 189,966, dated April 24, 1877; application filed March 15, 1877.

*To all whom it may concern:*

Be it known that I, THOMAS W. TEMPLE, of Los Angeles city and county, and State of California, have invented a Machine for Splitting Oyster-Shells; and I do hereby declare the following to be a full, clear, and exact description thereof, reference being had to the accompanying drawings.

My invention relates to a machine for splitting oyster-shells preparatory to opening the shell and removing the oyster.

In opening oyster-shells, a considerable force is required to split or separate the two halves of the shell, after which they can be easily opened and the oysters removed, and, although the opening of one oyster can be readily accomplished by an expert with an ordinary oyster-knife, the operation becomes very tedious and tiresome when a large number of oysters are operated upon.

My invention provides a splitting-machine in which the oysters can be successively placed, and the shells split or separated in a very expeditious, simple, and easy manner.

Referring to the accompanying drawings, Figure 1 is a perspective view of my device.

A represents a tray or pan, which is secured upon a suitable base or foundation, B. In one end of this tray or pan I secure a block, C, in the upper face or side of which is made a V-shaped groove, D, with concave sides.

E is a properly-braced standard, which is secured to the base B directly opposite, and in line with, the middle of the groove D. One end of a lever, F, is pivoted to the upper end of this standard, so that the lever will extend across above the groove, and lengthwise with it, although it could be otherwise arranged, as will appear hereinafter.

A short bar is suspended from the lever F, directly above the middle of the groove D, so that it will hang down into the groove. The lower end of this bar is made in the form of a wedge, and at the upper end of the wedge, and on each side, is a projection, as represented. This bar and wedge I call "the dart." The handle of the lever extends to any desired length across the pan or tray.

The oysters to be split or opened are taken one at a time and placed, by hand, in the trough or groove D, with their proper edges upward. The point of the wedge or dart is then inserted between the two halves of the shell, when, by pressing downward upon the end of the lever F, the wedge will be forced between the parts of the shell, so as to split or separate them. After the oyster shells are thus split they are thrown into a pile for subsequent opening, as hereinafter described.

For small oysters, a supplemental tray or grooved block, H, is placed inside the groove D, and in order to render it unmovable under the pressure, I corrugate or tooth its bottom edge and also a portion of the bottom of the groove D, so that the teeth or corrugations will interlock, and thus hold the parts in place. The pan or tray A will retain the liquor which escapes from the shell when it is split.

It will be evident that the standard E and lever F could be variously applied, so as to accomplish the same purpose in connection with the grooved block or oyster-holder.

After the shell is split the subsequent operation of opening the shells and removing the oysters can be accomplished with any suitable oyster-knife; but I have invented a special and extremely convenient implement for this purpose, for which I have simultaneously with this application made application for Letters Patent.

Having thus described my invention, what I claim, and desire to secure by Letters Patent, is—

1. In oyster-opening machines, the interchangeable blocks C H, for holding oysters of different sizes, constructed and arranged as described.

2. In combination with the hand-lever, the suspended dart, having a short thick wedge form for opening the shells quickly, and projections $i$, so that the dart cannot too deeply enter the shells.

In witness whereof I have hereunto set my hand and seal.

THOMAS W. TEMPLE. [L. S.]

Witnesses:
JOHN D. BICKNELL,
J. R. MCCONNELL.